US006845274B2

(12) United States Patent
Wang

(10) Patent No.: US 6,845,274 B2
(45) Date of Patent: Jan. 18, 2005

(54) COMMUNICATION PORT CONTROL MODULE FOR LIGHTING SYSTEMS

(75) Inventor: Shenghong Wang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 562 days.

(21) Appl. No.: 09/768,921

(22) Filed: Jan. 24, 2001

(65) Prior Publication Data

US 2002/0099451 A1 Jul. 25, 2002

(51) Int. Cl.[7] .................................................. G05B 11/01

(52) U.S. Cl. ............................. 700/23; 700/24; 700/25; 700/79; 700/59; 700/60; 315/294; 315/316; 377/2; 377/54; 377/70

(58) Field of Search .............................. 700/2, 3, 9, 19, 700/24, 25, 79; 714/49, 748, 749; 340/3.5, 3.54, 825.52; 315/130, 292, 294, 316; 362/227, 234, 253; 377/2, 54, 70

(56) References Cited

U.S. PATENT DOCUMENTS 3,671,865 A * 6/1972 Szumila et al. ............. 375/356
4,133,008 A * 1/1979 Tisue ........................ 358/446
4,156,280 A * 5/1979 Griess ........................ 702/58
4,347,499 A * 8/1982 Burkman et al. ...... 340/815.69
4,887,261 A * 12/1989 Roempp .................... 370/545
5,070,967 A * 12/1991 Katzy et al. ............... 187/297
5,406,173 A * 4/1995 Mix et al. .................. 315/156
5,498,931 A * 3/1996 Bedocs ...................... 315/158
5,553,083 A * 9/1996 Miller ........................ 714/748
5,576,700 A * 11/1996 Davis et al. .............. 340/3.31
5,612,711 A * 3/1997 Rose .......................... 345/59
5,698,952 A * 12/1997 Stebbins .................... 315/307
5,790,804 A * 8/1998 Osborne .................... 709/245
5,814,902 A * 9/1998 Creasy et al. .............. 307/116
5,920,156 A * 7/1999 Carson et al. ............. 315/317
5,946,209 A * 8/1999 Eckel et al. ................. 700/14
5,974,403 A * 10/1999 Takriti et al. .............. 705/412
6,012,110 A * 1/2000 Olson et al. ................. 710/60
6,160,426 A * 12/2000 Lee ........................... 327/116
6,369,524 B1 * 4/2002 Sid ........................... 315/292

* cited by examiner

*Primary Examiner*—Ramesh Patel

(57) ABSTRACT

An improved technique of interfacing a computer lighting device to a control computer is disclosed, wherein a hardware device is interposed between the control computer and the lighting device. The hardware device handles certain functions in hardware, thereby permitting the microprocessor at the lighting device to incur substantially less processing load.

14 Claims, 3 Drawing Sheets

COMMUNICATION PORT CONTROL MODULE FOR LIGHTING SYSTEMS

TECHNICAL FIELD

The present invention relates to lighting control networks, and more particularly, to an improved communication port control module ("CPCM") that acts as a serial interface to a network control computer for a lighting system. The present invention also relates to a system that offloads much of the processing normally required of a microprocessor at the lighting device being controlled, instead performing such processing in hardware contained in an interface device interposed between the lighting device being controlled and the control computer controlling said lighting device.

BACKGROUND OF THE INVENTION

Centralized lighting control systems are known in the art. Typically, the central computer controls the lighting system throughout a building or other facility, such as is defined by the DALI standard, a well-known lighting control standard. The lighting device being controlled interfaces to the central computer through a serial interface. A microprocessor at the lighting device usually performs serial to parallel conversion of incoming commands and data, error detection, and arbitration control between incoming and outgoing data and commands.

FIG. 1 shows typical prior art interface into a DALI control computer. The control computer 107 receives and transmits various data and commands serially over lines 103 and 104 as shown. A microprocessor 101 is employed at the lighting device to receive and process the commands and to control other elements of the lighting device over parallel bus 102. Functions executed by microprocessor 101 include error detection and correction, serial to parallel conversion, and edge detection, as required by the DALI standard. Control of arbitration of communications into and out of the lighting device is also implemented within microprocessor 101.

One problem with prior art systems such as that of FIG. 1 is that for cost reasons, microprocessor 101 is typically a basic low end capability processor such as an 8051. The tasks required to be performed by microprocessor 101 results in significant loading on the processor's limited capabilities, and decreased performance. The foregoing is true particularly with respect to error detection and correction algorithms, where significant mathematical processing may be required.

In view of the foregoing, there exists a need in the art for an improved technique of interfacing with a central lighting control computer that controls one or more lighting devices using a standard set of commands and a predetermined protocol.

There also exists a need in the art for an improved technique of minimizing the processing load presented to the basic capability microprocessors typically employed by a DALI compliant lighting device being controlled by a control computer.

SUMMARY OF THE INVENTION

The above and other problems of the prior art are overcome in accordance with the present invention, which relates to an improved method and apparatus for interfacing a central lighting control computer to a lighting device. In accordance with the invention, a separate hardware device is interposed between the microprocessor located at the lighting device, and the control computer controlling the device.

The separate device is implemented in hardware to perform error detection, noise filtering, and optionally other functions previously performed by the microprocessor, such as parallel to serial conversion, serial to parallel conversion, edge detection, arbitration control, and possibly others. The hardware device interposed between the lighting device and the control computer offloads much of the functionality from the microprocessor, providing faster operating speeds and permitting better use of less expensive microprocessors typically employed at such lighting devices. In a preferred embodiment, the serial to parallel conversion is implemented as a preshift register and a shift register, and the error detection is implemented in common hardware with serial to parallel conversion.

DETAILED DESCRIPTION OF THE INVENTION

Figure 1:
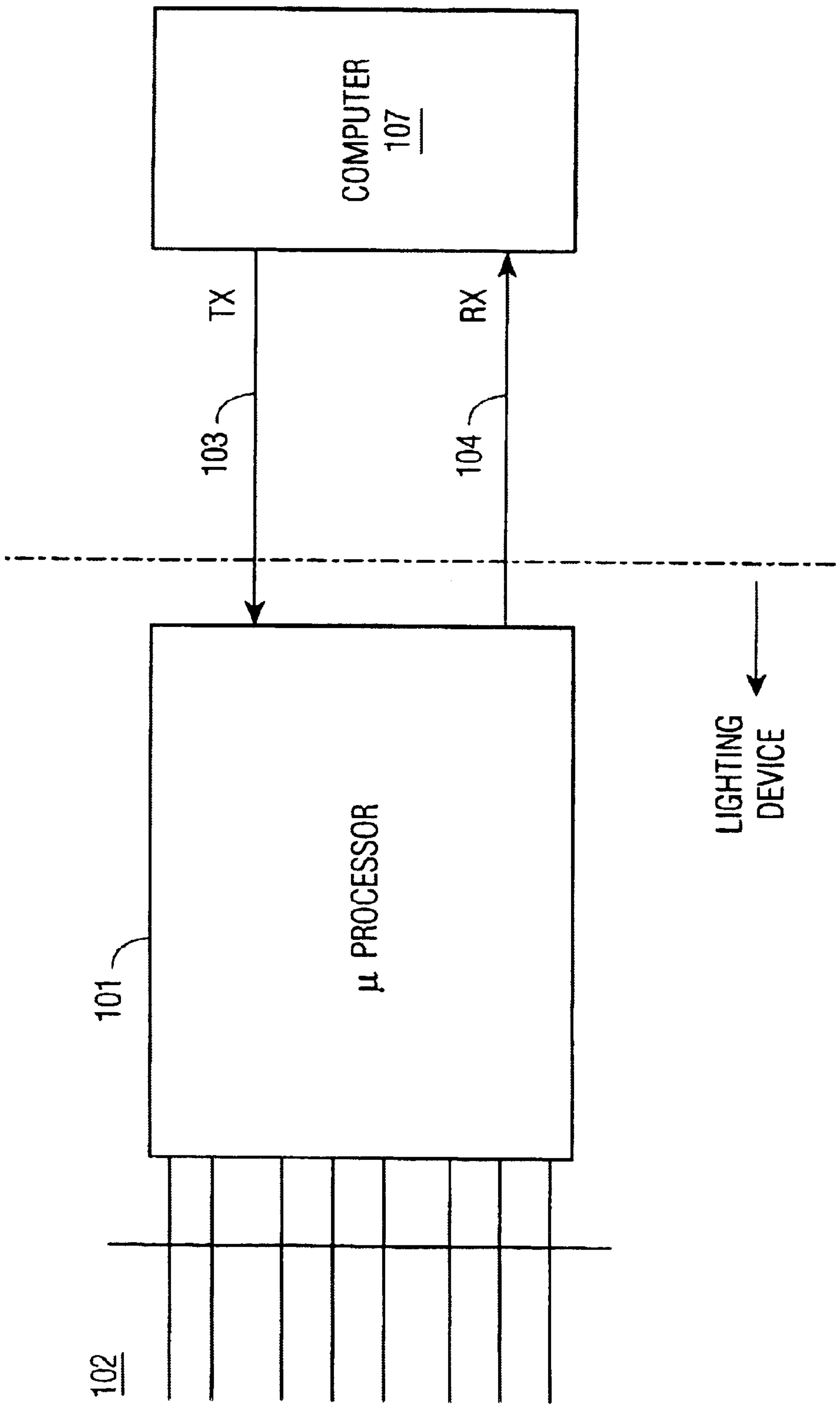
FIG. 1 PRIOR ART
FIG. 1 depicts a prior art lighting device microprocessor interfacing to a control computer.
Figure 2:
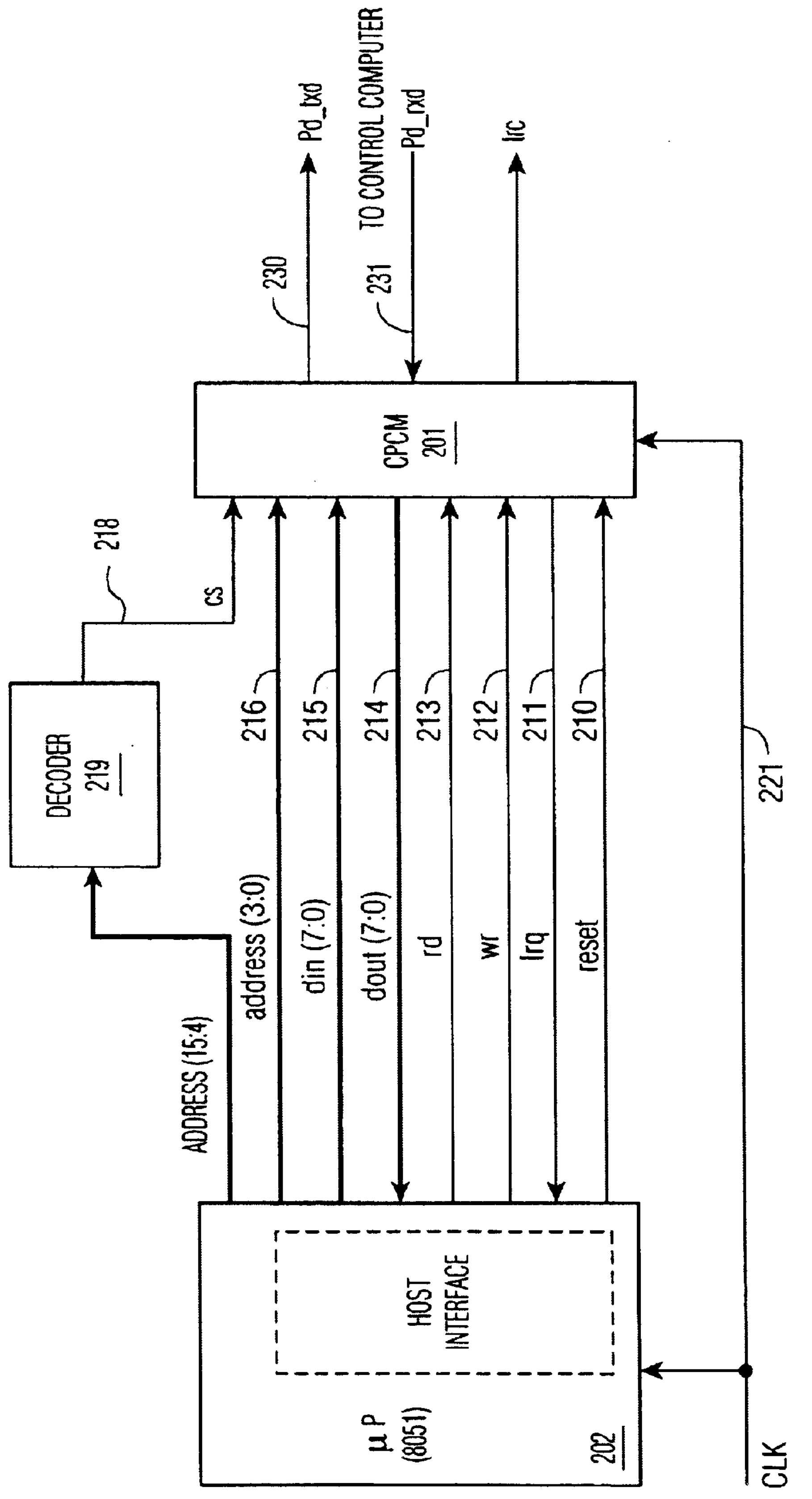
FIG. 2 depicts a block diagram of an exemplary embodiment of the present invention, showing a hardware device interposed between the lighting device microprocessor and the network control computer.

FIG. 2 depicts a block diagram of a hardware device CPCM 201 connected to a microprocessor 202. Not shown in FIG. 2 is the lighting device controlled by microprocessor 202. FIG. 2 includes a plurality of signals interfacing between CPCM 201 and microprocessor 202.

A decoder 219 and address lines 216 serve to permit communications to and from CPCM 201 over a parallel computer bus as is known in the art. More specifically, CPCM 201 is at a particular address known to microprocessor 202 and that address is asserted on the bus when communications with CPCM 201 are desired by the microprocessor. Several of the address lines are used for a chip select signal 218 and the remainder utilized as signal 216 in order to select the appropriate location within CPCM 201. Typically the most significant bits are utilized to decode as a chip select signal, and any remaining bits of the address are used to identify a location within the CPCM.

Signals 214 and 215 represent the data bus exchanging data between microprocessor 202 and CPCM 201. Also in a conventional fashion, read and write signals 213 and 212, respectively, are utilized, and an interrupt signal 211 advises microprocessor 202 when the CPCM 201 wishes to transfer data. A reset signal 201 and clock signal 221 are also used conventionally. Note that preferably clock signal 221 is the same clock signal utilized for both CPCM 201 and microprocessor 202 in order to synchronize the system.

Serial interfaces 230 and 231, to and from the control computer respectively, serve to interface the lighting device to the control computer so that the control computer may be configured as in the prior art. More particularly, the control computer need not have any knowledge that the CPCM hardware device 201 has been interposed between the control computer and the lighting device microprocessor 202. Thus, the standard commands that control intensity, timing, etc., as set forth in the exemplary DALI standard described below herein, may be used. Such an arrangement permits the control computer to operate with the same software that it uses in conventional systems, not being concerned with the fact that a separate hardware device has been placed between the light being controlled and the control computer.

Preferably, the arrangement of FIG. 2 implements the exemplary DALI standard interface, which provides for the exchange of commands and data on lines 230 and 231 in a serial fashion. The DALI interface is widely published and available and those who are skilled in the art are typically familiar with the standard.

Figure 3:
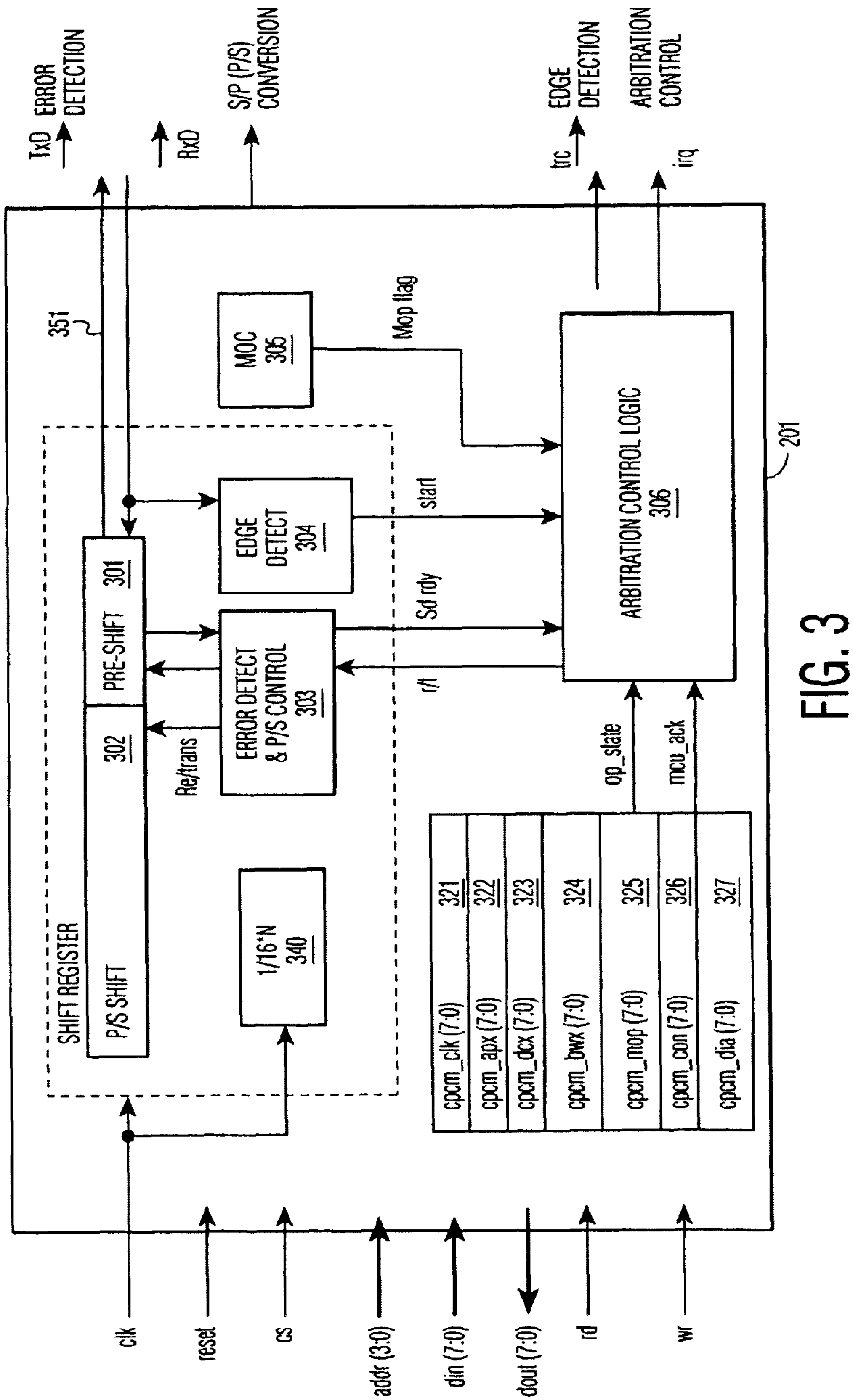
FIG. 3 depicts a more detailed block diagram of an exemplary embodiment of a hardware device of the present invention.

FIG. 3 represents a more detailed hardware diagram to implement the functions of error detection, serial to parallel conversion, edge detection and arbitration control for signals entering and exiting from the CPCM 201. A host interface transmits and receives parallel data over a PC conventionally.

In operation, data is received serially from the control computer and entered into a preshift register 301. The error detection noise filtering and serial to parallel conversion is implemented in conjunction with the pre-shift and shift registers 301 and 302, respectively. The error detection is a hardware circuit 313 that detects particular bit patterns in the incoming data, which violate rules of parity or other error detection techniques.

An edge detection circuit 304 helps to further detect certain errors. More specifically, in the exemplary embodiment utilizing the DALI Standard, each bit must have an edge since the data is encoded in a manner that a change of state takes place within each bit. Logical ones have a state transition in a first direction, and logical zeroes in a second direction. The failure to detect such an edge represents an error which should be detected by edge detect circuit 304. A straight forward arrangement of logic circuitry can detect the absence of such an edge, or latch its presence, to ascertain whether an error has occurred.

Additionally, the start of data is noted in the DALI Standard by a filling edge which is also detected by an edge detect circuit 304, and conveyed to an arbitration control logic 306. The arbitration control logic 306 ensures that data being held in locations 321 through 327 is not overwritten by new data before it is read out by the microprocessor. Conventional logic may be used to implement such a system wherein no new data is rewritten into any register 321 through 327 until the previous data is real out. A clock divider 340 serves to operate the CPCM 201 at a rate sufficient to allow for the parallel to serial conversion.

Registers 321 through 327 are special function registers. Register 321 is the clocking register and is used to set or adjust the data rate in order to provide for signals being read and written to and from the microprocessor and the control computer at different rates. More specifically, the serial to parallel conversion requires that the serial interface operate at many times the speed of the parallel interface in order to keep up with data being sent in parallel.

Register 322–324 stores DALI known commands such as address signals, standard data and other DALI commands. These commands and data would normally be stored in the microprocessor memory in prior systems, where no hardware CPCM is interposed between the control computer and the lighting device. The MOP register 325 is used to store a value indicative of manual dimming, in the event the manual dimming override is utilized to control the lighting device manually rather than via the control computer. Diagnostic computer 327 stores error codes and operating states in order to diagnose problems in a conventional fashion.

In operation, serial data arrives via line 351 and is shifted into preshift register 301. The data is not shifted into register 302 until it has been verified as correct via the error detection and P/S control block 303. Since the preshift register 301 is typically smaller that the shift register 302, the data from the preshift register 301 will be shifted to the shift register 302 plural times for each readout from the shift register 302. The error detection is performed in the smaller preshift register 301, and the data is only shifted to shift register 302 after passing the error detection testing in preshift register 301. Hardware device 303 is an error detection system which will substantially immediately detect signaling errors should such an error occur. The generation of such an error will be signaled back to the control computer, and the DALI protocol provides for the retransmission of such erroneously transmitted signals.

Additionally, if edge detector 304 detects a violation of the DALI protocol, such an error will also be conveyed to the microprocessor. In the exemplary DALI protocol, for example, a falling edge followed by a predetermined length "low" signal is required to being transmission of data, and an edge is required during each bit time. A violation of this rule indicates an error.

Note from interface 310 that only parallel data is transmitted to and from the microprocessor interface, and that such parallel data has already been checked for errors, and protocol violations, and is ready for decoding. Accordingly, the microprocessor at the lighting device may perform nothing more than the decoding of DALI commands and data. Such a system provides that the software in the microprocessor only perform a table lookup and basic control functions and does not require any error correction algorithms or arbitration control. This greatly increases speed.

While the above describes the preferred embodiment of the invention, various other modifications and additions will be apparent to those of skill in the art. Such modifications and additions are intended by the following claims.

What is claimed:

1. An apparatus for receiving signals from a control computer and for using the signals to control a lighting device, the apparatus comprising:

a hardware device including a serial to parallel converter operable to convert the signals from serial form to parallel form; and a lighting device microprocessor in electrical communication with the hardware device, wherein the lighting device microprocessor is operable to receive the signals in parallel form from the hardware device, and wherein the lighting device microprocessor is further operable to interpret the signals as commands for controlling the lighting device.

2. The apparatus of claim 1, wherein the hardware device further includes:

an edge detector circuit operable to perform a hardware edge detect of the signals.

3. The apparatus of claim 1, wherein said serial to parallel converter includes a preshift register, and wherein said hardware device further includes a control logic operable to hold a first portion of a first signal in the preshift register until the first portion of the first signal passes a first error detection testing.

4. The apparatus of claim 3, wherein said serial to parallel converter further includes a shift register; and wherein said control logic is further operable to hold the first portion of the first signal in the shift register and a second portion of the first signal in the preshift register until the second portion of the first signal passes a second error detection testing.

5. The apparatus of claim 1, wherein said serial to parallel converter is further operable to partition a first signal into portions;

wherein said serial to parallel converter includes a preshift register and a shift register;

wherein, upon receiving the first signal, a first portion of the first signal is shifted into the preshift register to be checked for errors; and wherein, upon a determination that the first portion of the first signal is error free, the first portion of the first signal is shifted from the preshift register into the shift register and a second portion of the second signal is shifted into the preshift register.

6. A method for receiving and processing a lighting control signal from a central computer, the method comprising:

operating a hardware circuit to perform serial to parallel conversion and error detection of the lighting control signal;

subsequently conveying the lighting control signal in parallel form from the hardware circuit to a lighting device microprocessor; and operating the lighting device microprocessor to decode the lighting control signal to thereby control a lighting device.

7. The method of claim 6, further comprising operating the hardware circuit to move the lighting control signal from a shift register to a storage register prior to conveying the lighting control signal in parallel form from the hardware circuit to the lighting device microprocessor.

8. The method of claim 7, further comprising:

operating the hardware circuit to delay placing any further data into the shift register until after the lighting control signal has been moved from the shift register to the storage register to thereby prevent any loss of the lighting control signal.

9. The method of claim 6, wherein the serial to parallel conversion and error detection of the lighting control signal includes:

operating the hardware circuit to shift a first portion of the lighting control signal into a preshift register to be checked for errors; and upon a determination that the first portion of the lighting control signal is error free, operating the hardware circuit to shift the first portion of the lighting control signal from the preshift register into a shift register and to shift a second portion of the lighting control signal into the preshift register.

10. A hardware device for interposing between a computer controlled lighting device and a control computer that controls the lighting hardware device, the hardware device comprising:

means for transmitting and receiving serial signals indicative of commands and data to control the lighting device;

means for ensuring that said data and commands include edges at predetermined times; and means for converting the serial signals in parallel form and conveying the signals in parallel form to a microprocessor for decoding and for utilization in controlling the lighting device.

11. A method of receiving a signal from a central computer to control a lighting device, the method comprising:

(a) placing a first portion of the signal into a preshift register, and checking the first portion of the signal for errors;

(b) shifting the first portion of the signal from the preshift register into a shift register if the first portion is error free; and (c) repeating (a) and (b) for each remaining portion of the signal before shifting the signal out of the shift register to thereby control the lighting device.

12. The method of claim 11, wherein the signal is shifted out of the shift register in response to commands from a separate set of arbitration control logic.

13. The method of claim 12, wherein the arbitration control logic also controls a manual override for controlling the lighting device manually.

14. The method of claim 11, wherein a determination of an error of a first portion of the signal in the preshift register causes a retransmission of the first portion of the signal from the central computer.

* * * * *